United States Patent
Wang et al.

(10) Patent No.: US 10,939,075 B2
(45) Date of Patent: *Mar. 2, 2021

(54) MONITORING TARGET OBJECT BY MULTIPLE CAMERAS

(71) Applicant: EMC IP Holding Company LLC, Hopkinton, MA (US)

(72) Inventors: Grissom Tianqing Wang, Shanghai (CN); Roby Qiyan Chen, Shanghai (CN); Bo Huang, Shanghai (CN); Yicang Wu, Shanghai (CN); James Zhongxiang Xiong, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,754

(22) Filed: Mar. 12, 2020

(65) Prior Publication Data
US 2020/0213562 A1 Jul. 2, 2020

Related U.S. Application Data

(63) Continuation of application No. 14/984,579, filed on Dec. 30, 2015, now Pat. No. 10,594,984.

(30) Foreign Application Priority Data

Jan. 4, 2015 (CN) .......................... 201510003758.5

(51) Int. Cl.
*H04N 7/18* (2006.01)
*G06K 9/00* (2006.01)

(52) U.S. Cl.
CPC ......... *H04N 7/181* (2013.01); *G06K 9/00771* (2013.01)

(58) Field of Classification Search
None
See application file for complete search history.

(56) References Cited

U.S. PATENT DOCUMENTS 10,594,984 B2 * 3/2020 Wang ................ G06K 9/00771

* cited by examiner

*Primary Examiner* — Christopher G Findley
(74) *Attorney, Agent, or Firm* — Brian J. Colandreo; Mark H. Whittenberger; Holland & Knight LLP

(57) ABSTRACT

Embodiments of the present invention relate to a computer program product, an apparatus and a method for monitoring a target object by multiple cameras by building a surveillance network based on attributes of the multiple cameras, the surveillance network describing reachability between locations of the multiple cameras; and in response to determining that the target object is detected at a first camera among the multiple cameras, monitoring the target object based on the reachability between locations of the multiple cameras.

18 Claims, 7 Drawing Sheets

MONITORING TARGET OBJECT BY MULTIPLE CAMERAS

RELATED APPLICATIONS

The subject application is a continuation of U.S. application Ser. No. 14/984,579; filed Dec. 30, 2015, which claims priority from Chinese Patent Application Number CN201510003758.5, filed on Jan. 4, 2015 at the State Intellectual Property Office, China, titled "METHOD AND APPARATUS FOR MONITORING A TARGET OBJECT BY A PLURALITY OF CAMERAS," the contents of which are herein incorporated by reference in its entirety.

FIELD

Various embodiments of the present disclosure relate to image processing.

BACKGROUND

Generally, with advanced developments of network technology and real-time surveillance technology, cameras may be used to monitor target objects like vehicles and/or persons in various application environments, such as traffic surveillance and security control. Typically, in a traffic surveillance area, specifically, when a traffic accident occurs, road information may be studied in real time by installing cameras at important roads, and target objects may be tracked by means of data monitored by the cameras.

Typically, in current scenarios manual operations may be involved during surveillance. For example, when a traffic accident occurs in a city road and the vehicle responsible for the accident has escaped the scene, semi-automatic surveillance may be used to some extent by existing technical solutions (for example, automatic recognition of license plate number of the vehicle, etc.), workers at a surveillance center may have to look for the vehicle responsible among data collected by cameras near an accident site, which will consume huge human efforts and time.

SUMMARY

Example embodiment of the present disclosure provided, an apparatus, a computer program product and a method for monitoring a target object by multiple cameras by building a surveillance network based on attributes of the multiple cameras, the surveillance network describing reachability between locations of the multiple cameras; and in response to determining that the target object is detected at a first camera among the multiple cameras, monitoring the target object based on the reachability between locations of the multiple cameras.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Figure 1:
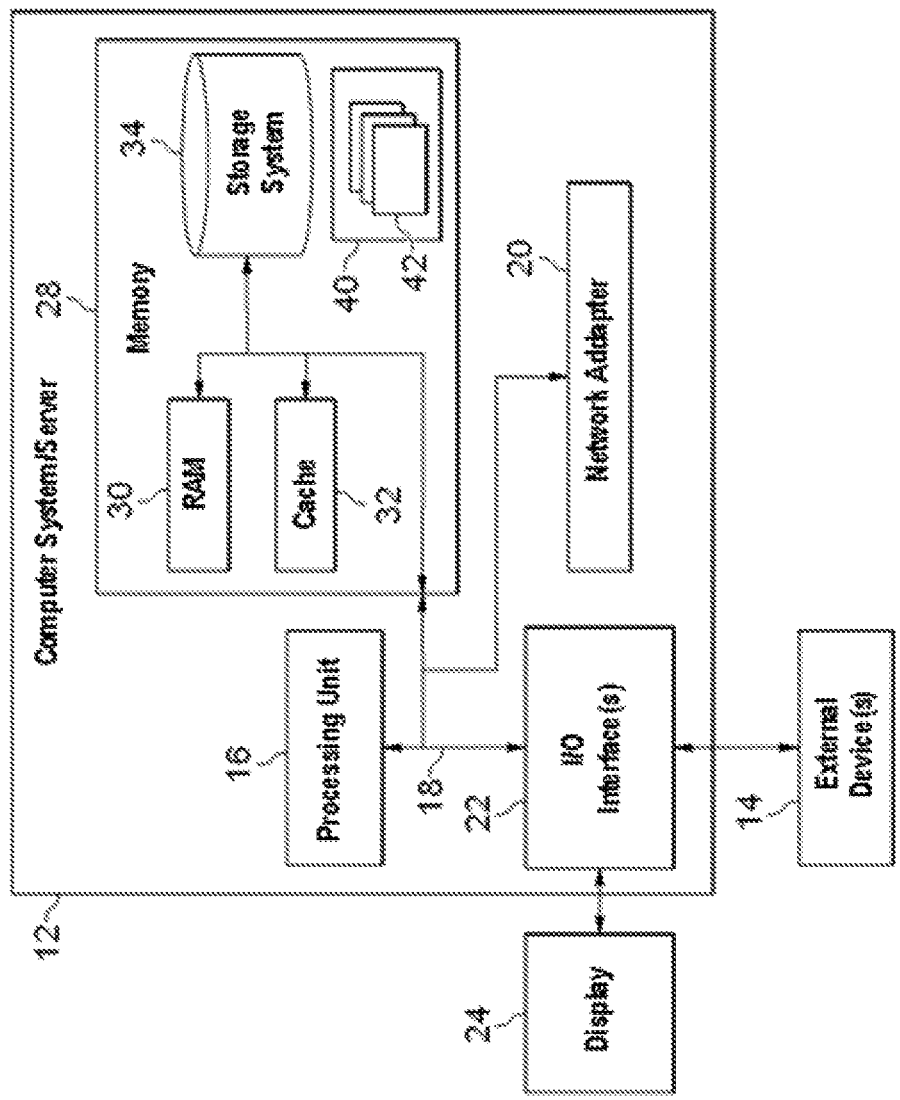
FIG. 1 schematically illustrates a block diagram of an exemplary computer system which is applicable to implement the embodiments of the present invention.

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models, as disclosed below Characteristics are as follows:

(1) On-demand self-service: a cloud consumer may unilaterally provision computing capabilities, such as server time and network storage, as needed automatically without requiring human interaction with the service's provider.

(2) Broad network access: capabilities may be available over a network and accessed through standard mechanisms that promote use by heterogeneous thin or thick client platforms (e.g., mobile phones, laptops, and PDAs).

(3) Resource pooling: a provider's computing resources may be pooled to serve multiple consumers using a multi-tenant model, with different physical and virtual resources dynamically assigned and reassigned according to demand. There may be a sense of location independence in that a consumer generally may have no control or knowledge over the exact location of the provided resources but may be able to specify location at a higher level of abstraction (e.g., country, state, or datacenter).

(4) Rapid elasticity: capabilities may be rapidly and elastically provisioned, in some cases automatically, to quickly scale out and rapidly released to quickly scale in. To a consumer, capabilities available for provisioning often appear to be unlimited and may be purchased in any quantity at any time.

(5) Measured service: cloud systems may automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as follows:

(1) Software as a Service (SaaS): the capability provided to the consumer may be to use the provider's applications running on a cloud infrastructure. Applications may be accessible from various client devices through a thin client interface such as a web browser (e.g., web-based e-mail). A consumer may not manage or control an underlying cloud infrastructure including network, servers, operating systems, storage, or even individual application capabilities, with a possible exception of limited user-specific application configuration settings.

(2) Platform as a Service (PaaS): the capability provided to the consumer may be to deploy onto the cloud infrastructure consumer-created or acquired applications created using programming languages and tools supported by a provider. A consumer may not manage or control an underlying cloud infrastructure including networks, servers, operating systems, or storage, but may have control over deployed applications and possibly application hosting environment configurations.

(3) Infrastructure as a Service (IaaS): the capability provided to a consumer may be to provision processing, storage, networks, and other fundamental computing resources where the consumer may be able to deploy and run arbitrary software, which may include operating systems and applications. A consumer may not manage or control the underlying cloud infrastructure but may have control over operating systems, storage, deployed applications, and possibly limited control of select networking components (e.g., host firewalls).

Deployment Models are as follows:

Private cloud: a cloud infrastructure may be operated solely for an organization. It may be managed by an organization or a third party and may exist on-premises or off-premises.

Community cloud: a cloud infrastructure may be shared by several organizations and supports a specific community that may have shared concerns (e.g., mission, security requirements, policy, and compliance considerations). It may be managed by organizations or a third party and may exist on-premises or off-premises.

Public cloud: a cloud infrastructure may be made available to general public or a large industry group and may be owned by an organization selling cloud services.

Hybrid cloud: a cloud infrastructure may be a composition of two or more clouds (private, community, or public) that remain unique entities but may be bound together by standardized or proprietary technology that enables data and application portability (e.g., cloud bursting for load-balancing between clouds).

In some embodiments, a cloud computing environment may be service oriented with a focus on statelessness, low coupling, modularity, and semantic interoperability. In some other embodiments, at the heart of cloud computing may be an infrastructure comprising a network of interconnected nodes.

In some embodiments, it may be desirable to develop and implement a technical solution that may automatically monitor a target object by multiple cameras. In some other embodiments, it may be desired that a technical solution may be integrated with existing surveillance systems and automated surveillance without changing basic configuration of existing surveillance systems may be achieved.

In one embodiment, there may be provided a method for monitoring a target object by multiple cameras. A further embodiment may include building a surveillance network based on attributes of the multiple cameras. A further embodiment may include a surveillance network describing reachability between locations of multiple cameras. A further embodiment may include in response to determining that a target object may be detected at a first camera among the multiple cameras, monitoring the target object based on the reachability between locations of the multiple cameras.

In one embodiment, there may be provided an apparatus for monitoring a target object by multiple cameras. A further embodiment may include a building module that may be configured to build a surveillance network based on attributes of the multiple cameras. A further embodiment may include a surveillance network describing reachability between locations of multiple cameras. A further embodiment may include a monitoring module configured to, in response to determining that a target object may be detected at a first camera among the multiple cameras, monitor the target object based on reachability between locations of the multiple cameras.

Embodiments of the present disclosure may be implemented without changing basic configuration of existing surveillance systems. In a further embodiment, a surveillance network may be built based on reachability between locations of multiple cameras. A further embodiment may include a target object that may be monitored based on reachability between locations of the cameras. A further embodiment may include manual workloads involved during surveillance that may be reduced. A further embodiment may include reducing computation workloads in a surveillance system since only data from one part of cameras needs to be analyzed.

FIG. 1 illustrates exemplary computer system 100 which is applicable to implement the embodiments of the present disclosure. As illustrated in FIG. 1, computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. A program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those skilled in the art should understand that a typical example of the application environment in which the embodiments of the present disclosure may be implemented has been depicted for illustration only. In the context of the present disclosure, the embodiments of the present disclosure may be implemented in various application environments that are already known or to be developed later.

Figure 2A:
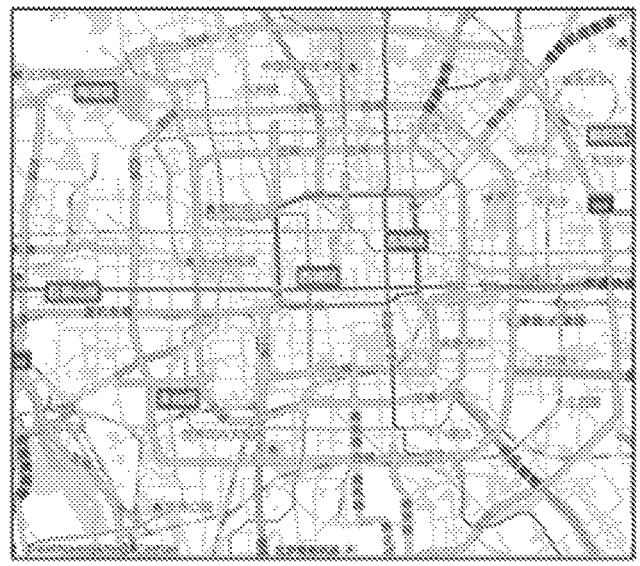
FIGS. 2A and 2B schematically illustrate block diagrams of a method for monitoring a target object according to one exemplary technical solution.
Figure 2B:
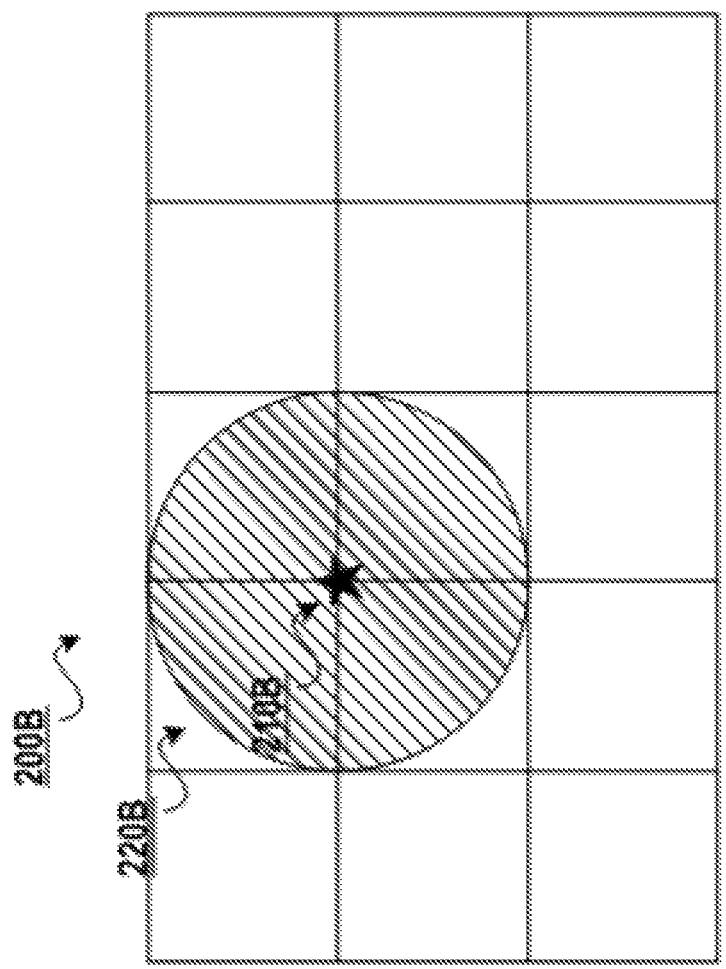

FIGS. 2A and 2B schematically show block diagrams 200A and 200B of a method for monitoring a target object according to one technical solution. FIG. 2A shows a road network structure of city roads, and FIG. 2B shows a block diagram of dividing a road network structure based on grids. As shown in FIG. 2B, grids may divide paths in the road network based on a predefined distance (for example, 500 m, etc.). When traffic accident 210B occurs in a given grid, influence range 220B of the traffic accident (as shown in shadow in FIG. 2) can be defined in a predefined radius around the location of traffic accident 210B, at which point a hit-and-run vehicle can be looked for within the influence range. Note although the influence range is defined in a circle in FIG. 2, the influence range may further be represented by a rectangle or other shape.

Although the technical solution shown in FIGS. 2A and 2B can look for the responsible vehicle in the entire influence range, such lookup may not accurate. For example, suppose a traffic accident occurs in an east-to-west lane of a highway and a vehicle involved in the accident escapes from east to west. Since the grid technology only considers a distance between the vehicle and the location of a traffic accident without considering the vehicle's driving direction and traffic information of a road network, an influence range may include an area which some vehicles may not be able to reach in a short time. In other words, the vehicle may not enter lanes in an opposite direction or flyovers, so it may not be necessary to search among vehicles running in an opposite direction (e.g., from west to east) or on nearby flyovers.

In some embodiments, since a responsible vehicle may not possibly run to an opposite lane or a flyover in a short time, searching for the responsible vehicle in an entire influence range may not accurate and may greatly increase workload of a surveillance system.

In view of drawbacks in existing technical solutions, various embodiments of the present disclosure propose a method for monitoring a target object by multiple cameras by building a surveillance network based on attributes of the multiple cameras. A further embodiment may include a surveillance network describing reachability between locations of multiple cameras. A further embodiment may include in response to determining that a target object may be detected at a first camera among multiple cameras, monitoring the target object based on reachability between locations of the multiple cameras.

In the embodiment of the present disclosure, consideration may be given to whether it is reachable between locations of multiple cameras. In a further embodiment only images from cameras reachable from a location of a responsible vehicle may be analyzed when looking for the responsible vehicle. In a further embodiment, an amount of to-be-analyzed images may be reduced significantly, thereby enhancing processing efficiency.

In some embodiment, throughout the context of the present disclosure, an example of a specific application environment of monitoring traffic conditions of roads may be shown for illustration only. However, those skilled in the art may understand that various embodiments of the present disclosure may further be applied to other environments, for example, monitoring specific human objects in other environments such as at city roads, airports, railway stations, inside buildings or at outdoors.

Figure 3:
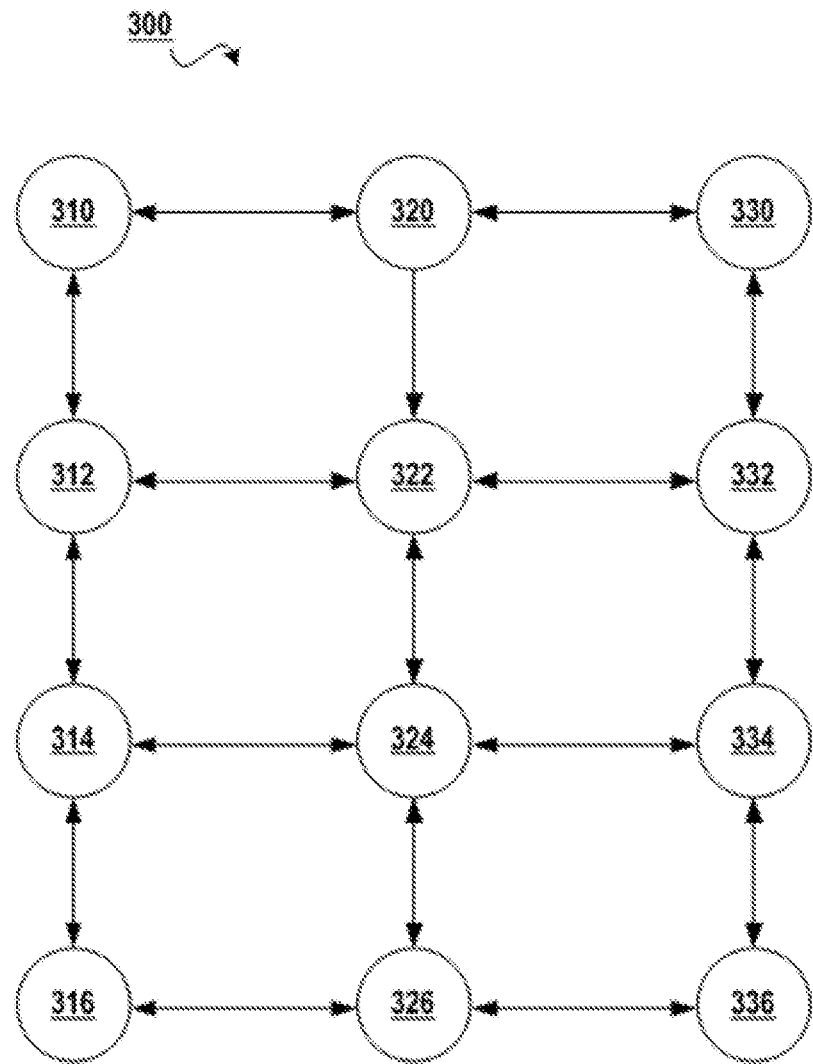
FIG. 3 schematically illustrates a block diagram of a surveillance network that is built based on multiple cameras according to one exemplary embodiment of the present disclosure.

FIG. 3 schematically shows a block diagram 300 of a surveillance network that is built based on multiple cameras according to one embodiment of the present invention. Block diagram 300 shows reachability between various cameras by way of a directed graph. Specifically, in this figure, the various cameras are shown in circles (e.g., 310, 312, . . . , 336, etc.), and reachability between the various cameras is shown in directed edges. For example, cameras 312 and 322 are two cameras at two intersections, and a two-way arrow between the two cameras represents there is a two-way road connection between locations of the two cameras. For another example, a one-way arrow between cameras 320 and 322 represents that locations of these two cameras are connected by a one-way road, and vehicles at camera 320 can run to the location of camera 320 via the one-way road, while vehicles at the location of camera 322 cannot run the reverse direction to the location of camera 320.

In one embodiment, FIG. 3 merely illustrates an example of the topology structure of a surveillance network built based on multiple cameras. Those skilled in the art should understand when the road network topology structure and cameras are located at different locations; a different surveillance network may further be generated. In a further embodiment, a "surveillance network" in the context of the present disclosure may be a logical model for describing reachability between cameras, but not a physical surveillance network that may be deployed along city roads and includes cameras and circuit connections.

Figure 4:
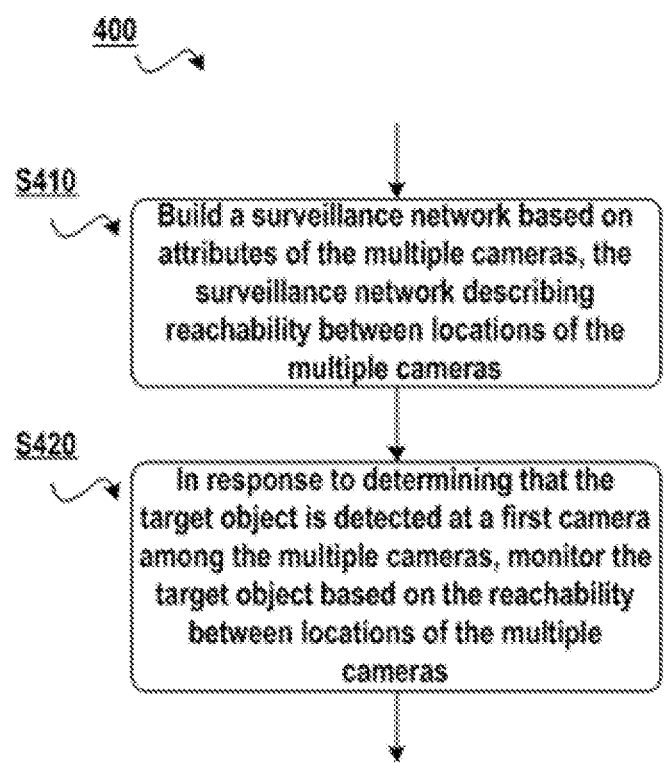
FIG. 4 schematically illustrates a flowchart of a method for monitoring a target object by multiple cameras according to one exemplary embodiment of the present.

FIG. 4 schematically shows flowchart 400 of a method for monitoring a target object by multiple cameras according to one exemplary embodiment of the present disclosure. In step S410, a surveillance network is built based on attributes of multiple cameras, the surveillance network describing reachability between locations of the multiple cameras. In this embodiment, attributes of the camera may include multiple respects, such as a camera's identifier, location (coordinates), an identifier of a road connected with a camera, road attributes, etc. In one embodiment, the purpose of building a surveillance network may be to describe reachability between locations of various cameras, i.e., whether there may be a road connection between two cameras.

Referring to FIG. 4 again, in step S420, in response to determining that a target object is detected at a first camera among the multiple cameras, the target object is monitored based on the reachability between locations of the multiple cameras. In this step, for example, if vehicle A hits and runs and is captured at a first camera, then the hit-and-run vehicle A may be searched for from other cameras that are reachable/proximate from the first camera, based on reachability described by the surveillance network.

In one embodiment, a vehicle A might only run on a road near a first camera; therefore, vehicle A may be searched for among images collected from cameras near a first camera (for example, intersections with direct road connections), instead of in an entire road network; and the workload of a surveillance system may be reduced significantly.

In one embodiment of the present disclosure, building a surveillance network based on attributes of multiple cameras may include acquiring location information of the multiple cameras and path information between the multiple cameras. A further embodiment may include path information describing reachability between locations of the multiple cameras. A further embodiment may include building a surveillance network based on location information and path information.

In a certain embodiment, two cameras connected by a directed edge may be cameras at two directly neighboring intersections, or cameras at two indirectly neighboring intersections.

In one embodiment of the present disclosure, building a surveillance network based on location information and path information may include setting attribute information of nodes in the surveillance network based on the location information. A further embodiment may include setting weights of edges in the surveillance network based on path information.

In some embodiment, although a topology structure of a surveillance network is illustrated with reference to FIG. 3 above, those skilled in the art may understand that because there might exist various types of roads in a city, road conditions might be affected by various aspects such as road type, traffic congestion conditions, weather conditions, path length, seasonal factors, time factors, etc.; and in this embodiment a weight may be attached to each directed edge based on factors in these respects.

In some embodiments, for example, factors affecting reachability between two cameras may be described as vectors (road type, traffic congestion conditions, weather conditions, path length, seasonal factors, . . . , time factors), and these factors in a vector may be normalized to a value. In some other embodiment, for example, coefficients within [0, 1] may be used to describe weights. In some other embodiments, wider a road is, faster traffic speed is, and thus higher is a weight, and vice versa. In some other embodiments, other forms to represent weights may be considered.

In one embodiment of the present disclosure, determining that a target object may be detected at a first camera among the multiple cameras may include extracting metadata from content monitored at the multiple cameras. A further embodiment may include in response to determining that a metadata matches a target object, determining that the target object is detected at the first camera among the multiple cameras.

In this embodiment, according to locations of cameras, multiple cameras may be connected to computing nodes (for example, referred to as edge computing nodes) with certain processing capabilities, wherein an edge computing node may preliminarily process content from the multiple cameras and extract metadata from captured content.

In one embodiment of the present disclosure, a metadata may include at least one of: vehicle information and person information. In an example embodiment, metadata of a target object may be extracted from images collected by cameras. A further embodiment may include different types of target objects that may involve different metadata. In a further embodiment, for example, when a target object is a vehicle, metadata may comprise, without limitation to, a vehicle's license plate number, color, model, brand name, size, and other information; when a target object is a person, metadata may comprise, without limitation to, a person's facial information, race, hair color, complexion, height, garment color and other information.

In a further embodiment, by extracting metadata at edge computing nodes, preprocessing of raw image data may be achieved at various edge computing nodes. In a further embodiment, computing tasks may be distributed evenly, i.e., computing tasks may be evenly distributed at various edge computing nodes. In a further embodiment, an edge computing node may be connected to a core computing node. In a further embodiment, a core computing node may be responsible for coordinating workloads of various edge computing nodes and assigning tasks to various edge computing nodes.

In a further embodiment, when a target object may be a red jeep with a license plate number of "ABCDE," and if it is found metadata extracted at a first camera may include the license plate number "ABCDE," then it may be determined that the target object is detected at the first camera.

In one embodiment, monitoring, in response to determining that a target object may be detected at a first camera among the multiple cameras, the target object based on a reachability between locations of the multiple cameras may include: searching among the multiple cameras for at least one second camera that may be in a reachable relationship with the first camera; and detecting that the target object at the at least one second camera.

Figure 5:
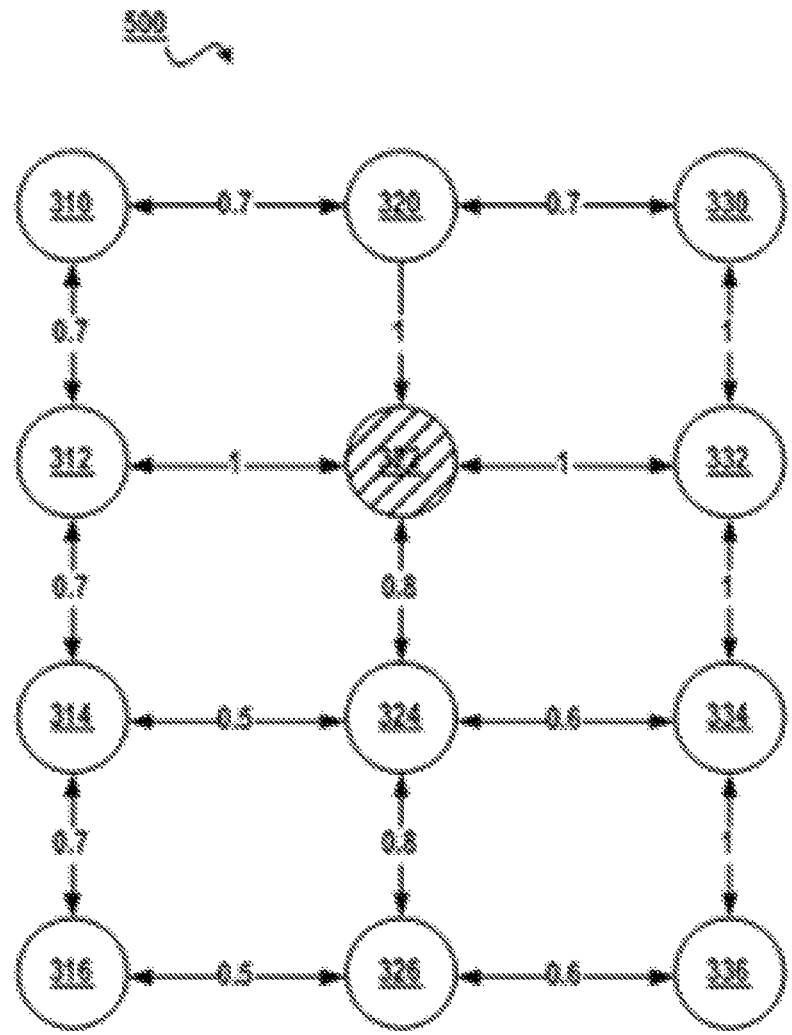
FIG. 5 schematically illustrates a block diagram the process of monitoring a target object based on reachability between locations of multiple cameras according to one embodiment of the present invention.

With reference to FIG. 5, detailed description is presented below to how to determine at least one second camera. Specifically, FIG. 5 schematically shows a block diagram 500 of the process of monitoring a target object based on reachability between locations of multiple cameras according to one embodiment of the present invention. Unlike the surveillance network shown in FIG. 3, directed edges in the surveillance network shown in FIG. 5 further has weights describing whether reachability is strong or weak. In this embodiment, a value within [0, 1] may be used to represent a weight. The greater the value, the higher the degree of reachability, and vice versa. Other forms to represent weights may be used.

Note although weights associated with two directions of the directed edge as shown in FIG. 5 remain the same, in other embodiments weights associated with two directions of the directed edge may differ.

When a target object is monitored at camera 322, it is found based on reachability in a surveillance network that locations of cameras 312, 324 and 332 are reachable from camera 322 via a road network (since cameras 320 and 322 are connected by a one-way arrow, camera 320 cannot be reached from camera 322). In this embodiment, the second cameras may include cameras 312, 324 and 332. Subsequently, the target object is searched for in images collected at cameras 312, 324 and 322.

Further, the second cameras may be searched for with priority along edges with the highest weight based on values of weights. For example, a weight between cameras 322 and 312 equals 1, a weight between cameras 322 and 332 equals 1, and a weight between cameras 322 and 324 equals 0.8; at this point, cameras 312, 322 and 324 may be found in order of these weights.

In one embodiment, detecting a target object at least one second camera may include: detecting a target object at least one second camera within a predefined time period.

In this embodiment, a predefined time period may be set. In a further embodiment, for example, a time period may be set as a specific time span (e.g., half an hour), or a time period may further be set as a time span from when a target object may be discovered at a first camera to when the target object is discovered at other camera.

In one embodiment, detecting a target object at least one second camera may include: in response to a target object being detected at a third camera among at least one second camera, prompting a movement path of the target object as "first camera→third camera." Continuing the example described with reference to FIG. 5, when a target object is found at camera 324, a movement path of the target object may be outputted as "camera 322→camera 324."

One embodiment may include identifying a third camera as a first camera. In a further embodiment, interactive implementation of the method discussed above may be performed. In a further embodiment, for example, when a target object is discovered at camera 324, camera 324 may be identified as a first camera, and a second round of surveillance may start. In a further embodiment, at this point, the first camera is camera 324, and the second cameras having reachability to the first camera may include cameras 314, 322, 334 and 326.

In a further embodiment, a target object may be searched for at cameras 314, 322, 334 and 326. In a further embodiment, when a target object is discovered at camera 314, camera 314 may be the third camera. In a further embodiment, the next round of surveillance may be launched based on camera 314. In a further embodiment, a movement path of a target object may be outputted continuously: "camera 322→camera 324→camera 314→ . . . ." In a further embodiment, a movement trajectory of a target object can be monitored effectively.

In one embodiment, multiple cameras may be connected to one edge computing node, and multiple edge computing nodes may be connected to a core computing node. In this embodiment, a core computing node may determine which target object may be monitored, and assigns surveillance tasks to multiple second cameras having reachability to a first camera that discovers a target object. In a further embodiment, when a target object is discovered at one of the multiple second cameras, a surveillance result may be returned to a core computing node, and the core computing node launches a next round of surveillance tasks.

In one embodiment, a camera among the multiple cameras may be one of: a fixed camera and a mobile camera. In other embodiments, it may not be intended to limit the type of cameras, i.e., cameras may be fixed cameras (for example, including without limitation, fixed cameras installed along roads, at intersections, highway entrances and exits, main entrances and exits of airports and railway stations, etc.), and may further include mobile cameras (for example, including without limitation, cameras installed on transportation means like buses, police cars and taxies). In this embodiment, a location of a mobile camera may be determined with a location of a vehicle, and reachability between various cameras may be determined based on locations of mobile cameras.

Figure 6:
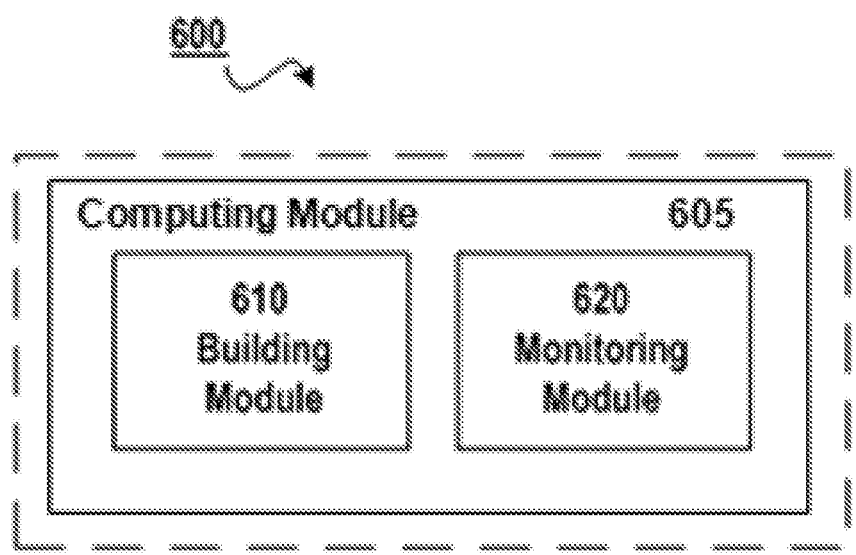
FIG. 6 schematically illustrates a block diagram of an apparatus for monitoring a target object by multiple cameras according to one exemplary embodiment of the present.

FIG. 6 schematically shows a block diagram 600 of an apparatus for monitoring a target object by multiple cameras. Specifically, there is provided an apparatus for monitoring a target object by multiple cameras, comprising: building module 610 configured to build a surveillance network based on attributes of the multiple cameras, the surveillance network describing reachability between locations of the multiple cameras; and monitoring module 620 configured to, in response to determining that the target object is detected at a first camera among the multiple cameras, monitor the target object based on the reachability between locations of the multiple cameras.

In one embodiment, building module 610 may include: an acquiring module configured to acquire location information of multiple cameras and path information between the multiple cameras, a path information describing reachability between locations of the multiple cameras; and a first building module configured to build a surveillance network based on the location information and the path information.

In one embodiment, first building module may include: a node setting module configured to set attribute information of nodes in a surveillance network based on location information; and an edge setting module configured to set weights of edges in a surveillance network based on path information.

In one embodiment, monitoring module 620 may include: an extracting module configured to extract metadata from content monitored at the multiple cameras; and a determining module configured to, in response to determining that a metadata matches a target object, determine that the target object may be detected at a first camera among the multiple cameras.

In one embodiment, monitoring module 620 may include: a searching module configured to search among the multiple cameras for at least one second camera that may be in a reachable relationship with a first camera; and a detecting module that may be configured to detect a target object at a at least one second camera.

In one embodiment, a detecting module may include: a first detecting module that may be configured to detect a target object at an at least one second camera within a predefined time period.

In one embodiment, a detecting module may include: a prompting module that may be configured to, in response to a target object being detected at a third camera among at least one second camera, prompt a movement path of the target object as "first camera→third camera."

In one embodiment, building module 610 and monitoring module 620, and any of its sub-components, may be built into a single computing module 605, which may be configured to perform the tasks of each of these modules and sub-modules. One embodiment may include identifying a third camera as a first camera. In one embodiment, a camera among the multiple cameras may be one of: a fixed camera and a mobile camera. In one embodiment, a metadata may include at least one of: vehicle information and person information Various embodiments implementing the method of the present disclosure have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present disclosure. The apparatus described in the present disclosure may include several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which may include one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for monitoring a target object by multiple cameras, the method comprising:
dynamically building a surveillance network based on attributes from a plurality of cameras, the surveillance network defining reachability by the target object between locations of the plurality of cameras; and
in response to determining that a target object is detected at a first camera of the plurality of cameras, monitoring the target object based on the reachability between locations of the-plurality of cameras, wherein monitoring, in response to determining that the target object is detected at a first camera among the plurality of cameras, the target object based on the reachability between locations of the plurality of cameras comprises:
  searching among the plurality of cameras for at least one second camera that is in a reachable relationship with the first camera including determining one or more cameras that are unreachable from the location of the first camera based upon, at least in part, the reachability between the location of the first camera and each other camera of the plurality of cameras; and
  detecting the target object at the at least one second camera by searching for the target object in images collected from the at least one second camera.

2. The method according to claim 1, wherein building a surveillance network based on attributes of the plurality of cameras comprises:
  acquiring location information of the plurality of cameras and path information between the plurality of cameras, the path information defining reachability by the target object between locations of the plurality of cameras; and
  building the surveillance network based on the location information and the path information.

3. The method according to claim 2, wherein building the surveillance network based on the location information and the path information comprises:
  using camera attribute information; and
  setting weights of edges in the surveillance network based on the path information.

4. The method according to claim 1, wherein determining that a target object is detected at a first camera among the plurality of cameras comprises:
  extracting metadata from content monitored at the plurality of cameras, wherein the metadata comprises at least one of: vehicle information and person information; and
  in response to determining that the metadata matches the target object, determining that the target object is detected at the first camera among the plurality of cameras.

5. The method according to claim 1, wherein detecting the target object at the at least one second camera comprises:
  detecting the target object at the at least one second camera within a predefined time period.

6. The method according to claim 1, wherein detecting the target object at the at least one second camera comprises:
  in response to the target object being detected at a third camera among the at least one second camera, prompting a movement path of the target object as "first camera→third camera"; and
  identifying the third camera as the first camera.

7. The method according claim 1, wherein a camera among the plurality of cameras is one of: a fixed camera and a mobile camera.

8. An apparatus for monitoring a target object by multiple cameras, the apparatus configured to dynamically build a surveillance network based on attributes from a plurality of cameras, the surveillance network defining reachability by the target object between locations of the plurality of cameras; and
  in response to determining that a target object is detected at a first camera among the plurality of cameras, monitor the target object based on the reachability between locations of the plurality of cameras, wherein monitoring, in response to determining that the target object is detected at a first camera among the plurality of cameras, the target object based on the reachability between locations of the plurality of cameras comprises:
  searching among the plurality of cameras for at least one second camera that is in a reachable relationship with the first camera including determining one or more cameras that are unreachable from the location of the first camera based upon, at least in part, the reachability between the location of the first camera and each other camera of the plurality of cameras; and
  detecting the target object at the at least one second camera by searching for the target object in images collected from the at least one second camera.

9. The apparatus according to claim 8, the apparatus further configured to:
  acquire location information of the plurality of cameras and path information between the plurality of cameras, the path information defining reachability by the target object between locations of the plurality of cameras; and
  build the surveillance network based on the location information and the path information.

10. The apparatus according to claim 9, further configured to:
  use camera attribute information to build the surveillance network; and
  set weights of edges in the surveillance network based on the path information.

11. The apparatus according claim 8, further configured to:
  extract metadata from content monitored at the plurality of cameras, wherein the metadata comprises at least one of: vehicle information and person information; and
  in response to determining that the metadata matches the target object, determine that the target object is detected at the first camera among the plurality of cameras.

12. The apparatus according to claim 8, further configured to:
  detect the target object at the at least one second camera within a predefined time period.

13. The apparatus according to claim 8, further configured to:
  in response to the target object being detected at a third camera among the at least one second camera, prompt a movement path of the target object as "first camera→third camera"; and
  identify the third camera as the first camera.

14. The apparatus according to claim 8, wherein a camera among the plurality of cameras is one of: a fixed camera and a mobile camera.

15. A computer program product comprising:
  a non-transitory computer readable medium encoded with computer executable program code, wherein the code enables execution across one or more processors for:
  dynamically building a surveillance network based on attributes from a plurality of cameras, the surveillance network defining reachability by the target object between locations of the plurality of cameras; and
  in response to determining that a target object is detected at a first camera among the plurality of cameras, monitoring the target object based on the reachability between locations of the plurality of cameras, wherein monitoring the target object based on the reachability between locations of the plurality of cameras includes:

searching among the plurality of cameras for at least one second camera that is in a reachable relationship with the first camera including determining one or more cameras that are unreachable from the location of the first camera based upon, at least in part, the reachability between the location of the first camera and each other camera of the plurality of cameras; and detecting the target object at the at least one second camera by searching for the target object in images collected from the at least one second camera.

16. The computer program product according to claim 15, wherein building a surveillance network based on attributes of the plurality of cameras comprises:

acquiring location information of the plurality of cameras and path information between the plurality of cameras, the path information defining reachability by the target object between locations of the plurality of cameras; and building the surveillance network based on the location information and the path information, further comprising:

using camera attribute information to build the surveillance network; and setting weights of edges in the surveillance network based on the path information.

17. The computer program product according to claim 16, wherein determining that a target object is detected at a first camera among the plurality of cameras comprises:

extracting metadata from content monitored at the plurality of cameras, wherein the metadata comprises at least one of: vehicle information and person information; and in response to determining that the metadata matches the target object, determining that the target object is detected at the first camera among the plurality of cameras.

18. The computer program product according to claim 15, wherein detecting the target object at the at least one second camera comprises:

in response to the target object being detected at a third camera among the at least one second camera, prompting a movement path of the target object as "first camera→third camera"; and identifying the third camera as the first camera.

* * * * *